United States Patent [19]
Hackstein et al.

[11] 3,938,134
[45] Feb. 10, 1976

[54] UNBALANCE VECTOR DISPLAY DEVICE AND PROCESS

[75] Inventors: Guenter Hackstein, Niedernhausen, Odenwald; Paul Holdinghausen, Bickenbach; Karl Homilius, Nieder-Ramstadt, all of Germany

[73] Assignee: Carl Schenck AG, Darmstadt, Germany

[22] Filed: Aug. 30, 1974

[21] Appl. No.: 501,884

[30] Foreign Application Priority Data
Sept. 5, 1973    Germany............................ 2344622

[52] U.S. Cl.................. 340/324 M; 73/66; 73/71.4; 73/462; 350/160 LC
[51] Int. Cl.².............................................. G08B 5/36
[58] Field of Search......... 340/324 M; 73/71.4, 465, 73/66; 350/160 LC

[56] References Cited
UNITED STATES PATENTS

| | | | |
|---|---|---|---|
| 3,220,247 | 11/1965 | Goodman | 73/71.4 X |
| 3,322,485 | 5/1967 | Williams | 350/160 LC |
| 3,554,061 | 1/1971 | Holdinghausen | 73/465 X |
| 3,581,002 | 5/1971 | Dodds | 350/160 LC |
| 3,622,224 | 11/1971 | Wysocki et al. | 350/160 LC |
| 3,746,426 | 7/1973 | Masi | 350/160 LC |
| 3,781,080 | 12/1973 | Aftergut | 350/160 LC |
| 3,798,452 | 3/1974 | Spitz et al. | 350/160 LC |
| 3,835,465 | 9/1974 | Tannas et al. | 350/160 LC |

*Primary Examiner*—David L. Trafton
*Attorney, Agent, or Firm*—W. G. Fasse; W. W. Roberts

[57] ABSTRACT

The present display device combines a liquid crystal display panel with a transparent dial for example having a polar coordinate system on which the information shown by the panel may be displayed with regard to its value and location or angular position. This type of display is especially suitable for displaying unbalance informations of a body to be balanced. In the present process an unbalance representing signals are separated into horizontal and vertical components, which are then supplied respectively to the row and column electrodes of said liquid crystal display device. The dial itself may also be constituted as a liquid crystal display panel. The row and column electrodes may be provided in several sets for simultaneously displaying several unbalance informations, for example, relating to different planes in a body to be balanced.

12 Claims, 16 Drawing Figures

UNBALANCE VECTOR DISPLAY DEVICE AND PROCESS

BACKGROUND OF THE INVENTION

The present invention relates to an unbalance vector display device and process, especially suitable for use in connection with balancing machines. More specifically, the present display device uses liquid crystal panel means for the display and recording of unbalance information, especially vector information in a system for the balancing of rotatable work-pieces.

Liquid crystal display arrangements are known and have been used in data processing systems for the displaying of information. The liquid crystals are located between suitable plates provided with electrodes arranged in rows and columns. These electrodes have terminals to which the voltages are applied, which are necessary for making the information visible. U.S. Pat. No. 3,499,112 discloses, for example, such a display device, please see also Funkschau 1972, Volume 1, pages 17 to 19.

Heretofore the vectorial information representing an unbalance has been displayed, for example, by means of mechanical-optical devices or by employing cathode ray tubes. Such systems require a substantial electro-mechanical and electronic control system or equipment and hence substantial costs are involved. U.S. Pat. No. 3,554,061 discloses an apparatus and method for the indication of unbalance representing values with the aid of a cathode ray tube.

OBJECTS OF THE INVENTION

It is the aim of the invention to achieve the following objects singly or in combination:

to simplify the display of an unbalance information in such a manner that the use of mechanical-optical display devices or cathode ray tubes may be obviated;

to combine a liquid crystal display device with a dial in such a manner that a value, for example, an unbalance representing value may be displayed with regard to its quantity and also with regard to its angular position, for example, on a body to be balanced;

to combine in one display panel several sets of row electrodes and several sets of column electrodes so that different informations may be displayed simultaneously;

to distinguish in one and the same display panel different sets of row electrodes from each other and also to distinguish different sets of column electrodes from each other and to arrange these different sets in such a manner that the row and column electrodes of a system may cooperate with each other;

to combine a dial which itself comprises a liquid crystal display device with a further liquid crystal display device which is energized by the information representing signals;

to signify a particular type of information by an auxiliary information display adjacent to the particular information, for example, a light dot representing the particular information may be further characterized by positioning a lighted semi-circle in a specific position relative to the light dot;

to control the display of a dial in the form of a liquid crystal device in such a manner that the dial may be varied, for example, by changing its display range or even the type of dial; and to combine the control means for the liquid crystal display panel and if desired also for the liquid crystal dial as an integral part of the display unit.

SUMMARY OF THE INVENTION

According to the invention there is provided an information display device comprising one or more liquid crystal display panels and a transparent dial means superimposed upon said liquid crystal display panel or panels. The dial and the panels are held together by appropriate means, for example, a frame structure or by gluing.

According to the invention there is further provided a process for displaying an unbalance information for a body to be balanced in one or more planes, by employing a liquid crystal display device having row and column electrodes with respective input terminals. A dial is superimposed on the liquid crystal display device. The unbalance information is separated in two signal components, preferably horizontal and vertical signal components, which are stored in respective separate signal channels. The separately stored signal components are supplied to respective input terminals of the row and column electrodes to simultaneously display with the aid of the superimposed dial the size and angular position of the unbalance information relative to a body to be balanced.

Where the balancing or rather the unbalance information is derived from several planes in the body to be balanced, a liquid crystal display panel is employed which includes several sets of row electrodes and several sets of column electrodes. The row electrodes may be distinguished from each other by employing in adjacent rows electrode symbols having different configurations. Similarly, differently shaped electrode elements may be employed in forming the column electrodes so as to distinguish the column electrodes of one display system from the column electrodes of the other display system. Thus, differently shaped electrode elements are employed to alternate with each other in the display panel, whereby electrode elements of the same configuration are arranged opposite each other so as to form a pair for the liquid crystal display.

BRIEF FIGURE DESCRIPTION

In order that the invention may be clearly understood, it will now be described, by way of example, with reference to the accompanying drawings, wherein.

DETAILED DESCRIPTION OF EXAMPLE EMBODIMENTS

Figure 1:
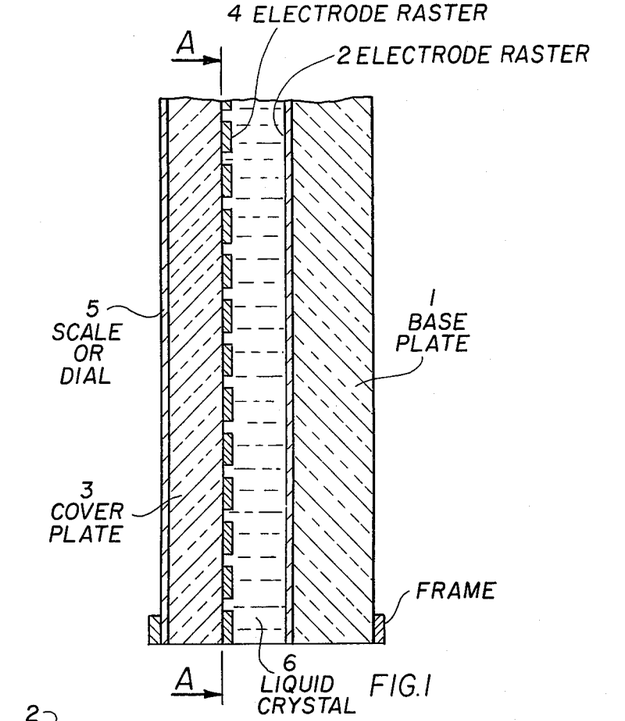
FIG. 1 is a sectional view through a display panel according to the invention on an enlarged scale and showing only a portion thereof.

FIG. 1 illustrates a sectional view of a portion of one embodiment of an unbalance information display panel according to the invention. The panel may be held together by frame means which as such are conventional or by gluing which is also conventional. The panel comprises a base plate 1 which is preferably made of transparent material, such a glass or acrylic glass. A raster 2 of parallel electrodes is secured to one face of the base plate 1. The manufacturing of such electrode rasters is conventional and could, for instance, be accomplished by printed circuit techniques. A cover plate 3 also carrying a raster 4 of electrodes is juxtaposed relative to the base plate so that the electrodes face each other and are arranged to cross each other preferably at right angles. The base plate 1 and the cover plate 3 are spaced from each other by conventional spacer means not shown for simplicity's sake. The space between the base plate 1 and the cover plate 3 is filled by liquid crystal material 6.

Figure 2:
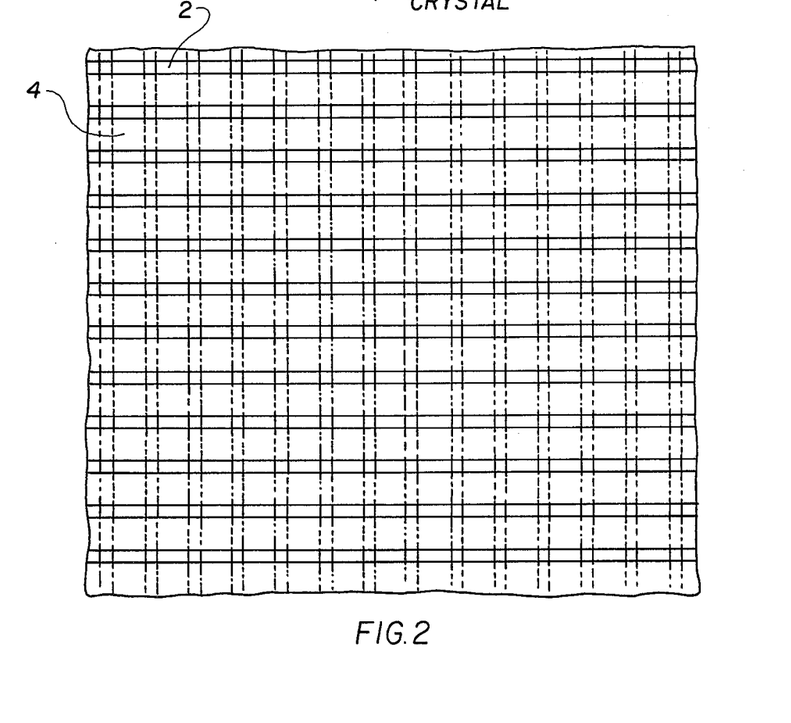
FIG. 2 is a plan view in the plane designated by the line AA in FIG. 1.

As mentioned, in the simplest embodiment the electrodes 2 and 4 are disposed to form an orthogonal grid as shown in FIG. 2. The cover plate 3 is also made of transparent material such as glass or the like. According to the invention a dial 5 is secured to the outside of the cover plate 3. The dial 5 may, for example, be etched or printed on the surface of the cover plate 3. Where a polar coordinate display is desired the dial comprises a plurality of concentric circles, whereby the spacings between adjacent circles may be calibrated for directly indicating the quantity of a displayed information relative to a coordinate origin. The dial 5 may also be provided in the form of a rectangular coordinate system, or even in the form of an oblique angle coordinate system. If desired, the dial 5 may also be provided merely as a portion or portions of a complete coordinate system, whereby for instance the origin of the coordinate system may be suppressed.

Figures 10, 11, 12, 13:
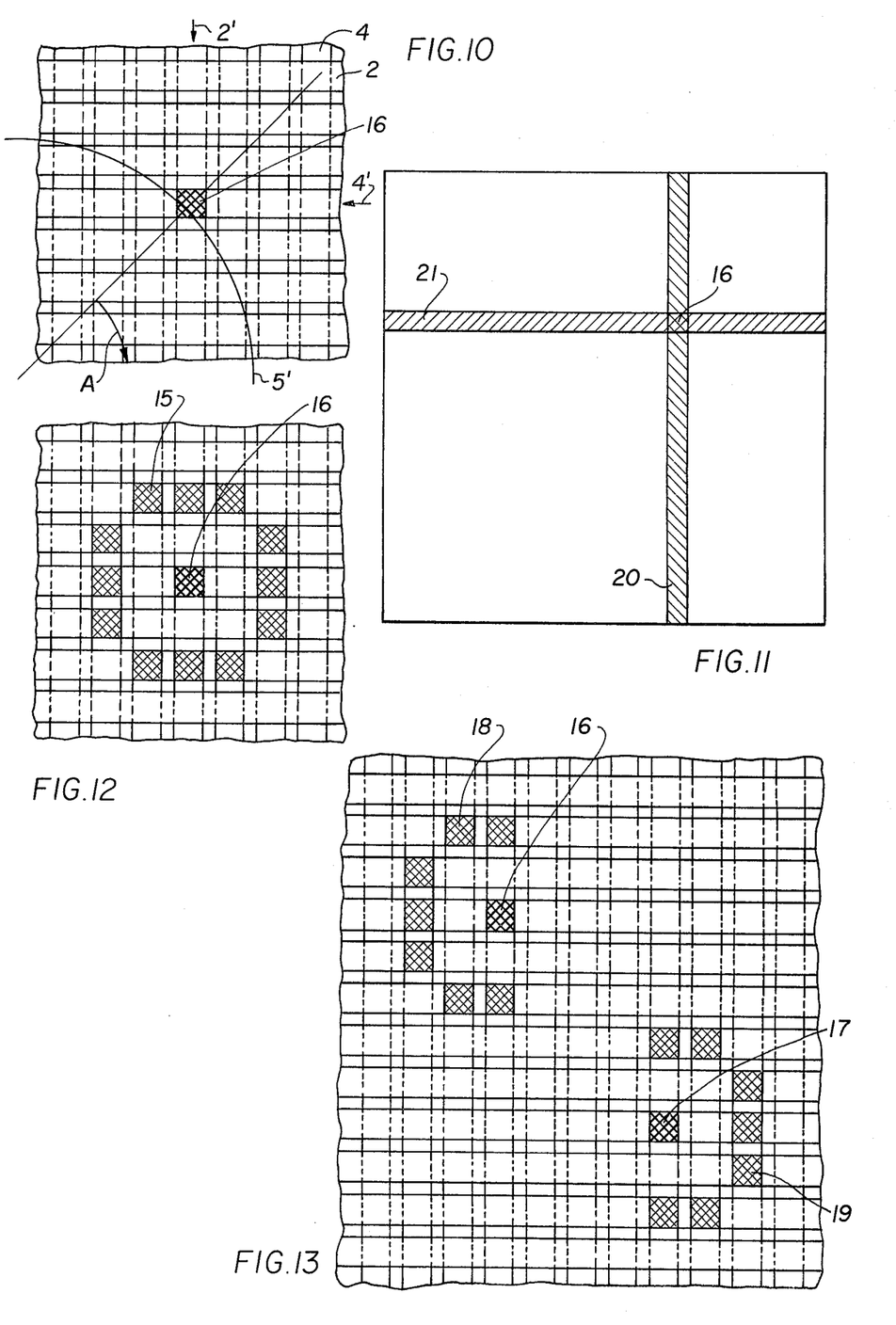
FIGS. 10, 11, 12, and 13 illustrate the display of an unbalance information and separate characterizations of such information on a display device according to the invention.

Since the liquid crystal material 6 is located in the space between the electrodes 2 and 4 a suitable voltage corresponding to the unbalance information to be displayed is selectively applied to the respective row and column electrodes 2 and 4 for the display of such information by activating the corresponding liquid crystal cell located at the crossing of two electrodes selectively energized. In combination with the dial 5 it is possible to display the size as well as the angular position of the unbalance information. The voltage applied to any one electrode may be smaller than the voltage required to orient the liquid crystals at the particular crossover. However, it must be assured that the sum of the voltages applied to the selected crossing is sufficient to effect the orientation of the liquid crystals at that crossing for the display of a respective light dot. Thus, only the liquid crystals at the selected crossing will be oriented whereas the remainder of the panel will not be sufficiently energized for a display. Referring in this connection to FIG. 10, a light dot 16 will be produced by applying a voltage signal to the vertical electrode 2' and to the horizontal electrode 4'. The resulting light dot 16 may, for instance, be located adjacent the circle 5' of the dial 5 at an angle A, whereby the size and location of the unbalance is displayed.

Figure 3:
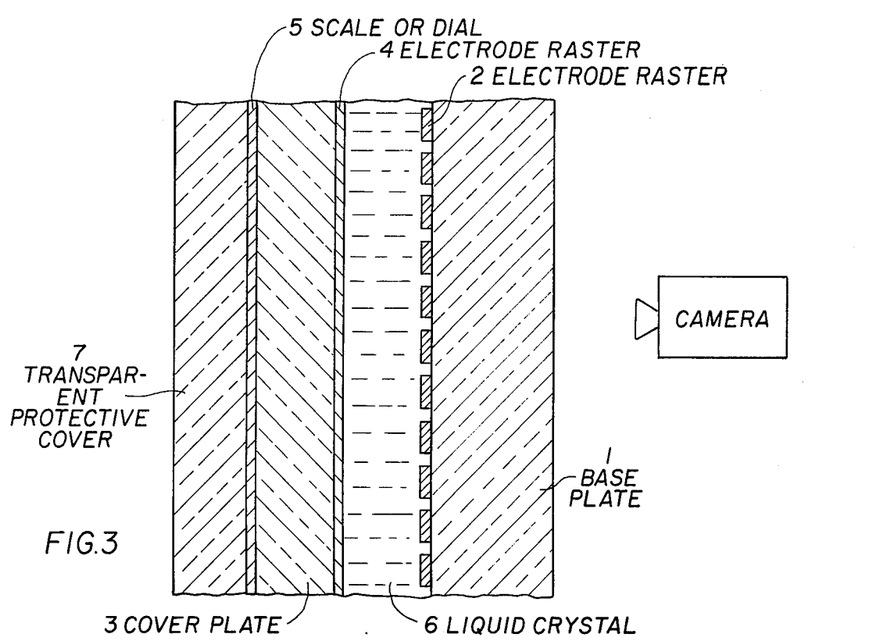
FIG. 3 is a view similar to that of FIG. 1 but illustrating another embodiment of the present display device.

FIG. 3 illustrates a further embodiment similar to that of FIG. 1 except that a transparent protective cover 7 is provided for the dial 5. Again the base plate 1 and the cover plate 3 are provided with respective electrode rasters 2 and 4, which are spaced from each other to receive therebetween a liquid crystal material 6. The protective cover 7 may have the outlines of the dial 5 secured thereto or the dial 5 may be secured to the outer surface of the cover plate 3. In any event, the protective cover 7 may be removably secured to the liquid crystal display panel by conventional clamps or the like not shown. In the embodiment where the dial 5 is secured to the cover 7, it may be possible to replace one type of dial by another by simply loosening the clamps removing one cover 7 with its dial 5 and inserting another cover 7 with another dial 5. A further advantage of the embodiment of FIG. 3 is seen in that the dial outline is protected against scratching, soiling, and the like. Where it is desired to display unbalance informations derived for example, from two different planes in a body to be balanced, the display panels of FIGS. 2 and 3 may advantageously be arranged next to each other, so that the unbalance information from one plane may be displayed on one panel while the unbalance information from another plane may be simultaneously displayed on the next adjacent display panel.

However, according to the invention, it is also possible to display unbalance informations derived from different planes in a body to be balanced on an integrated display panel. Such a panel combines at least two liquid crystal display panels in one unit as shown in FIG. 4.

Referring to FIG. 4, there is again shown a partial sectional view through a further embodiment of a liquid crystal display unit comprising two panels D1 and D2. The electrode raster 2 is secured on an intermediate plate 8 and the electrode raster 4 is secured to the cover plate 3. A liquid crystal material 9 is located between the two electrode rasters 2 and 4. Further electrode means 11, for example, also in the form of a raster are secured to the opposite side of the intermediate plate 8 which is transparent. Further electrode means also preferably in the form of a raster 12 are secured to the base plate 1 and liquid crystal material 10 is located between the electrode means 11 and 12. Preferably a contrast enhancing member 13 provides a desirable background for the electrode means 11 of the panel D2. A dial 5 may be secured to the front face of the cover place 3 as described above also in the embodiment of FIG. 4. The contrast enhancing member 13 may, for example, be a transparent layer of paint or a colored transparent foil or the like so that the display of the panel D2 will be constrasted against the display of the panel D1.

Figure 4:
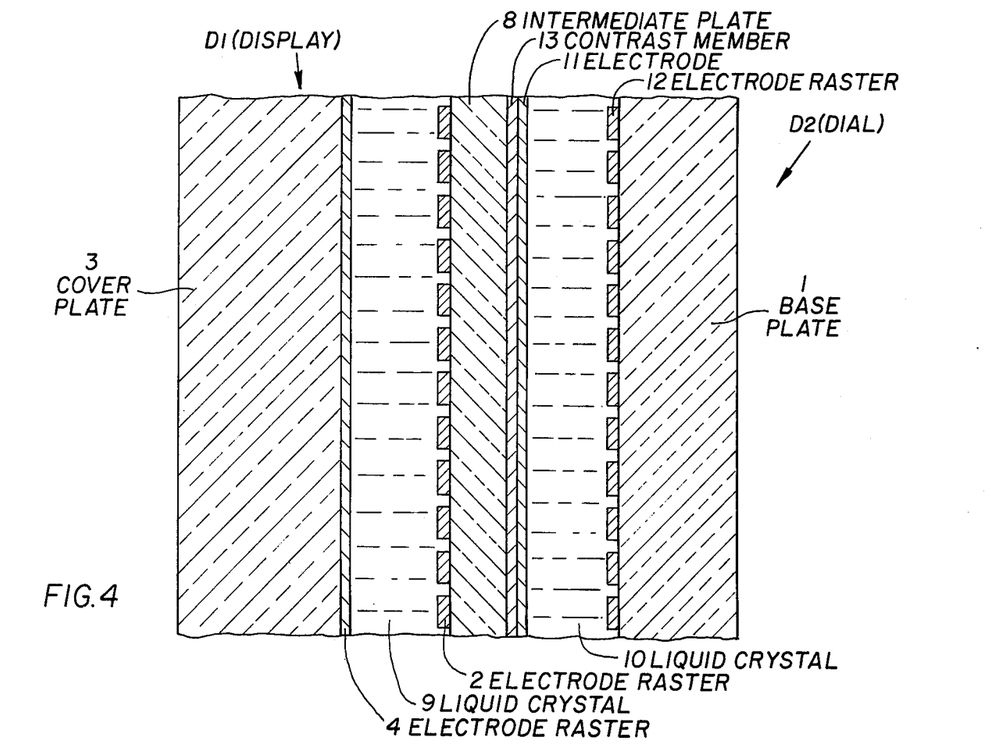
FIG. 4 is again a view similar to that of FIGS. 1 and 3, but illustrating yet another embodiment of the invention combining two liquid crystal display devices, one of which may form a dial.

The embodiment of FIG. 4 may be advantageously modified by giving the electrodes 11 and 12 the configuration of a dial, whereby the unbalance information may be displayed by the liquid crystal display panel D1 against the background of the dial displayed by the liquid crystal display panel D2. To this end a control voltage corresponding to a dial information is applied between the electrodes 11 and 12 so that the liquid crystals between these electrodes are oriented to display a dial, for example, in a polar coordinate, a rectangular or in an oblique coordinate system.

The display of a light dot 16 has been described above especially with reference to FIG. 10. FIGS. 11, 12, and 13 illustrate how the display of a light dot may be enhanced or underlined. Thus, in FIG. 11, a light cross made up of an illuminated vertical bar 20 and an illuminated horizontal bar 21 enhances the display of the light dot 16 appearing at the crossing point of the two bars 20 and 21. This enhancement may be accomplished by a respective control of the supply voltages. In other words, the respective electrodes or rather pairs of electrodes forming the bar 20 and the bar 21 are energized with voltages, the sum of which is sufficient to cause the desired orientation of the liquid crystal material between the energized electrodes. FIG. 12 illustrates the enhancement of the light dot 16 by means of a surrounding somewhat circular configuration 15 of light dots, the light intensity of which is preferably somewhat lower than that of the light dot 16. The energization and control of the display shown in FIG. 12 will be described in more detail below with reference to FIG. 15. FIG. 13 illustrates the display of two light dots 16 and 17, which are enhanced by somewhat semicircular configurations 18 and 19 surrounding the corresponding light dot in a predetermined manner. Here again the light intensity of the light dots in the configurations 18 and 19 should preferably be somewhat lower than that of the light dots 16 and 17. The control of the display illustrated in FIG. 13 will be described in more detail below with reference to FIG. 16. In any event, the control of the display of enhancing symbols such as shown for example, in FIG. 12 in the form of a somewhat circular configuration and as shown in FIG. 13 in somewhat semicircular configurations may be accomplished by a time multiplexing control of the respective electrode of the display panel. Referring especially to FIGS. 12 and 13 the display enhancing symbols may also be employed for displaying on the same panel balancing informations derived from, for example, two different planes of a body to be balanced. Thus, it would, for example, be possible to display a light dot alone for the unbalancing information of one plane and to distinguish another light dot from the first mentioned light dot by surrounding it with a somewhat circular configuration. Similarly, two light dots 16 and 17 as shown in FIG. 13 could be characterized as representing information from two different planes through a body to be balanced, by the semi-circles 18 and 19 of which the semi-circle 18 opens to the right, whereas the semi-circle 19 opens to the left. This type of signifying symbol, for example in the form of a semi-circle may also be used to indicate whether the body to be balanced is arranged in a vertical or in a horizontal position. Assuming that the illustration of FIG. 13 shows a vertically arranged body to be balanced, rotating the symbols 18 and 19 by 90° could signify that the body to be balanced is arranged in a horizontal position. The understanding could also be just the opposite, if desired.

According to the invention it is also possible to use alphanumeric symbols and/or other characterisitc electrode designs to visually separate data shown simultaneously on the display panel. Thus, an 'a' or a 1 could be displayed to signify the information derived from plane 1 and a 'b' or a 2 could be used to signify the information derived from plane 2 of a body to be balanced. Thus, the present invention is especially adaptable for the display of informations derived from several balancing planes. Further, where a liquid crystal arrangement is employed as a dial as has been described above with reference to FIG. 4, a complete dial may be displayed instead of a display with additional signifying symbols. In any event, the electrodes themselves may be formed from electrode elements having specific configurations, for example, to distinguish one set of row electrodes from another set of row electrodes, and also to distinguish one set of column electrodes from another set of column electrodes.

Figure 5:
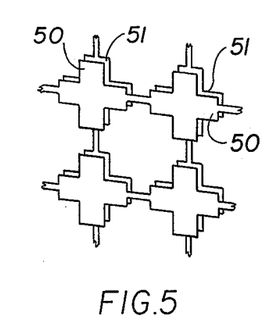
FIGS. 5, 6, 7, 8, and 9 illustrate differently shaped electrode element configurations which are used to form two or more distinct display systems in a single liquid crystal display panel.
Figure 6:
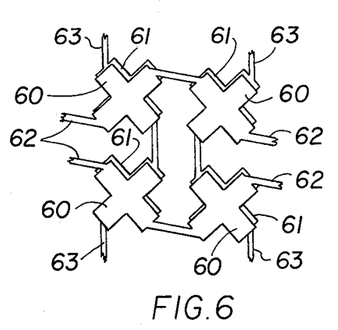

FIGS. 5 to 9 illustrate such electrode elements having different distinguishing configurations. These configurations are conductively interconnected to form respective row and column electrodes, which function in the same manner as the linear or straight row and column electrodes symbolically shown in the embodiments of FIGS. 1 to 4. Thus, FIG. 5 shows cross shaped electrode elements 50 and 51. The electrode elements 50 are conductively interconnected to form row electrodes. The cross electrodes 51 are conductively interconnected to form column electrodes. FIG. 6 illustrates X-shaped electrode elements 60 and 61. The electrode elements 60 are interconnected to form row electrodes 62. The electrode elements 61 are interconnected to form column electrodes 63.

Figure 7:
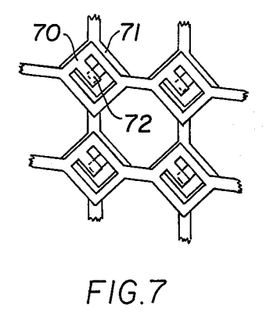
Figure 8:
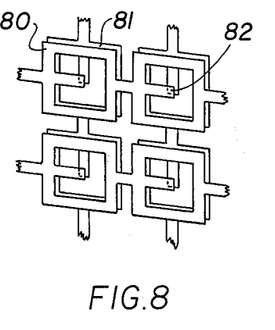
Figure 9:
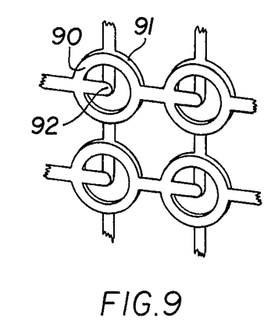

Diamond shaped electrode elements 70 and 71 are shown in FIG. 7. Square shaped electrode elements 80 and 81 are shown in FIG. 8. Ring shaped electrode elements 90 and 91 are shown in FIG. 9. The electrode elements 70, 80 and 90 are interconnected conductively to form row electrodes. The electrode elements 71, 81 and 91 are conductively interconnected to form column electrodes. A feature common to the illustrations of FIGS. 7, 8 and 9 is a tongue 72, 82, and 92, which reaches inwardly from each electrode element in such a manner that the inward ends of the tongues forming a pair are in register with each other, whereby either a diamond, a square, or a round dot may be displayed surrounded by a diamond, square, or a ring frame. Depending on the shape of the free end of the tongue, the dot may be diamond shaped, square or round. Thus, the dot in a display panel employing the element configurations of FIGS. 7 and 8 would have a diamond, or a square shape whereas the dot displayed by means of the configuration shown in FIG. 9 would be round.

Figure 17:
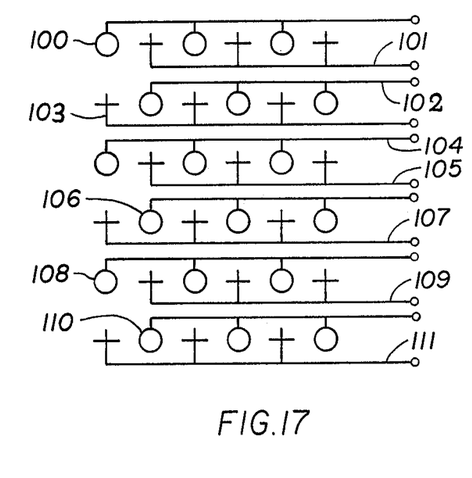
FIG. 17 shows schematically two sets of differently shaped electrode elements arranged to form two sets of electrode rows or two sets of electrode columns depending on the orientation of the plate to which these electrode elements are secured.

Referring to FIG. 17 the several electrode element configurations may be combined on a single panel, such as a transparent glass panel not shown for simplicity's sake. Twelve row electrodes 100 to 111 are shown schematically in FIG. 17, whereby ring shaped and cross shaped electrode elements alternate with each other in each row so as to form two row electrodes. The same configuration would be provided on the opposite panel except rotated by 90° so as to form the column electrodes in the same manner as the row electrodes shown in FIG. 17. Thus, electrode elements of the same configuration would be arranged in register with each other to form a liquid crystal display panel according to the invention suitable for simultaneously displaying, for example, the unbalance informations derived from two different planes extending through a body to be balanced. Thus, the circular electrode elements could be used to display the information derived from one plane and the cross shaped elements could be used to display the unbalance information derived from another plane. Any of the illustrated electrode element configurations could be combined with any other configuration in the alternating fashion illustrated in FIG. 17.

Figure 14:
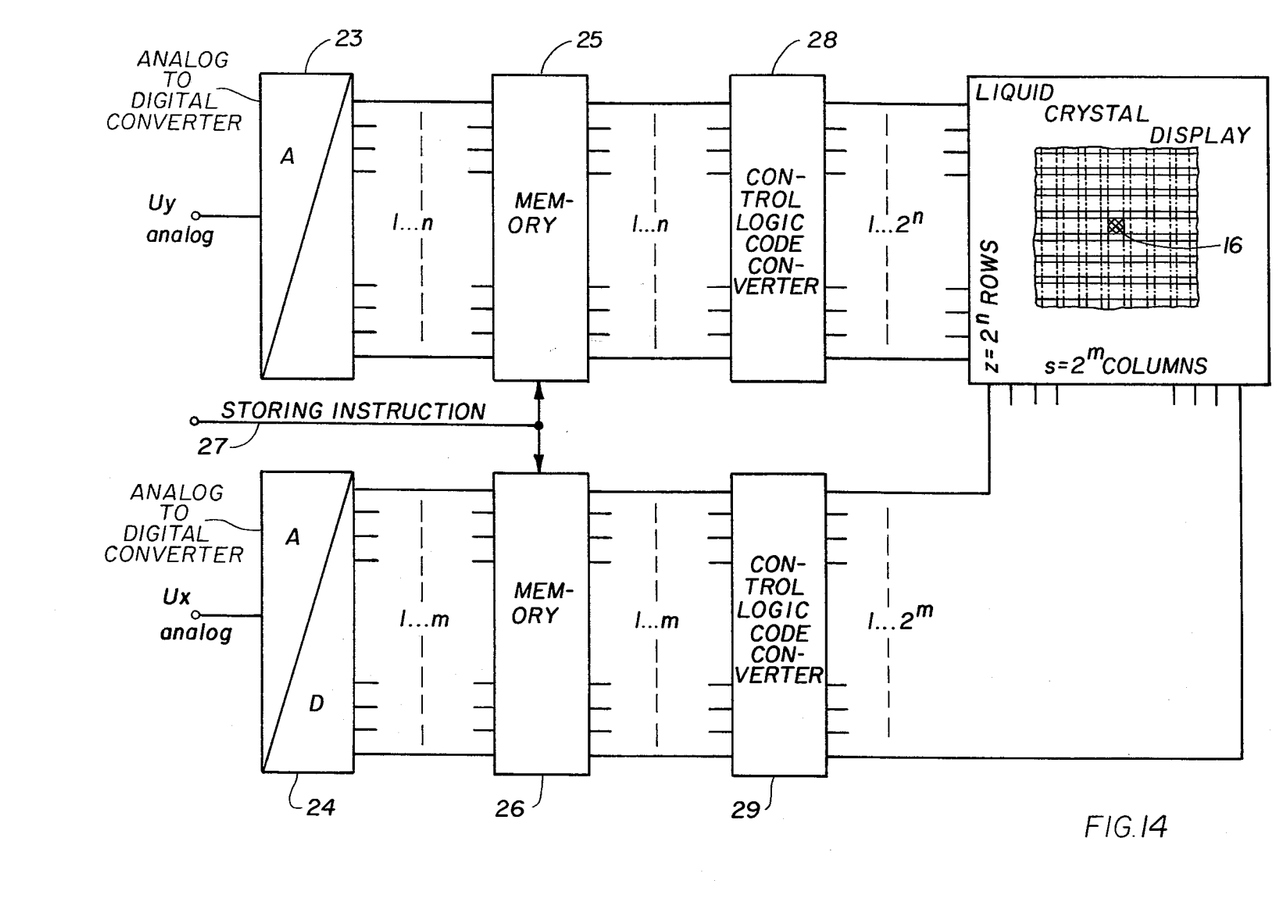
FIG. 14 illustrates a block circuit diagram of the electronic circuit means for controlling the display of an information on a liquid crystal display device according to the invention.
Figure 15:
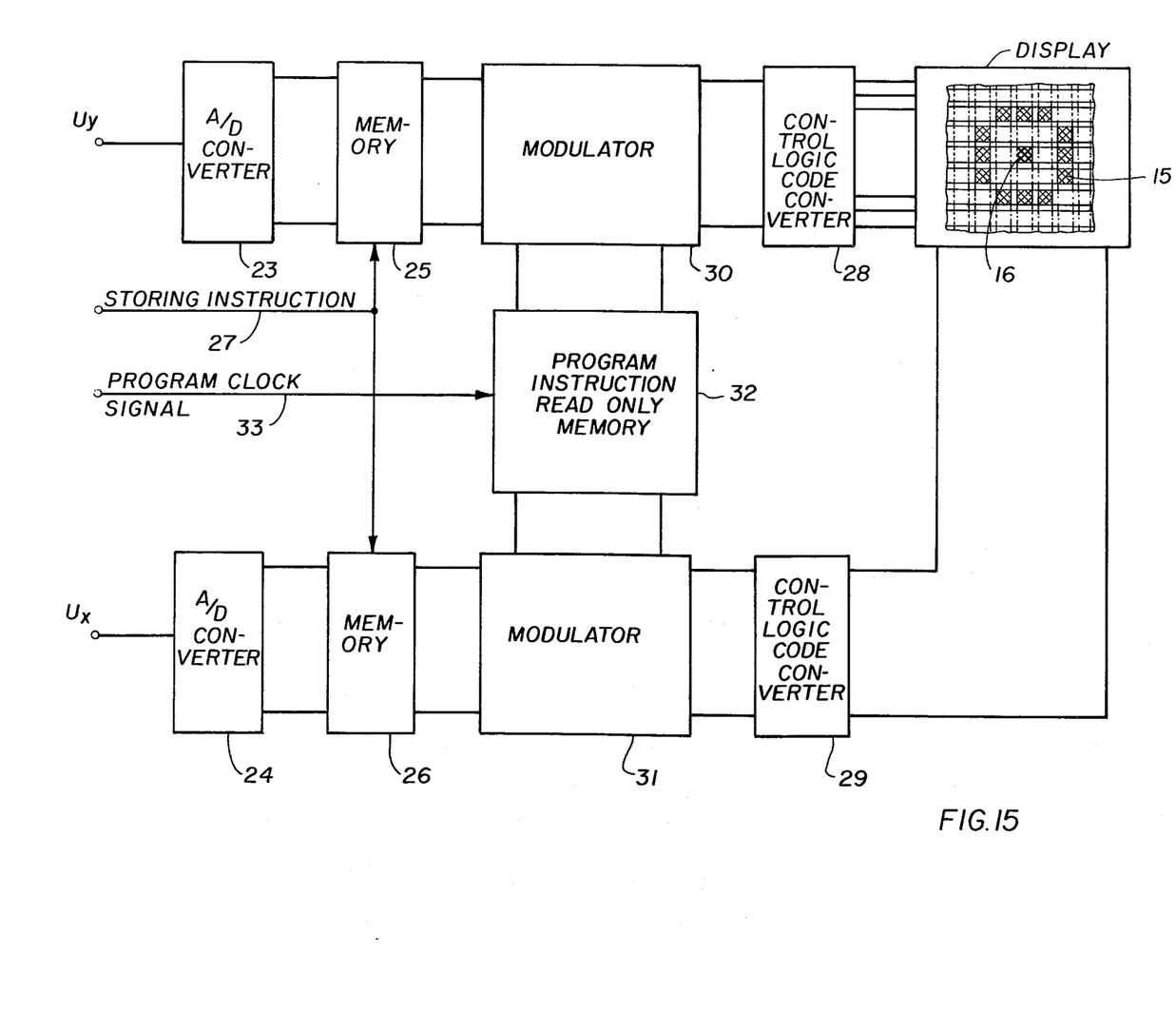
FIG. 15 illustrates a modified block circuit diagram for controlling the display of a light dot and a characterizing light circle surrounding the light dot.
Figure 16:
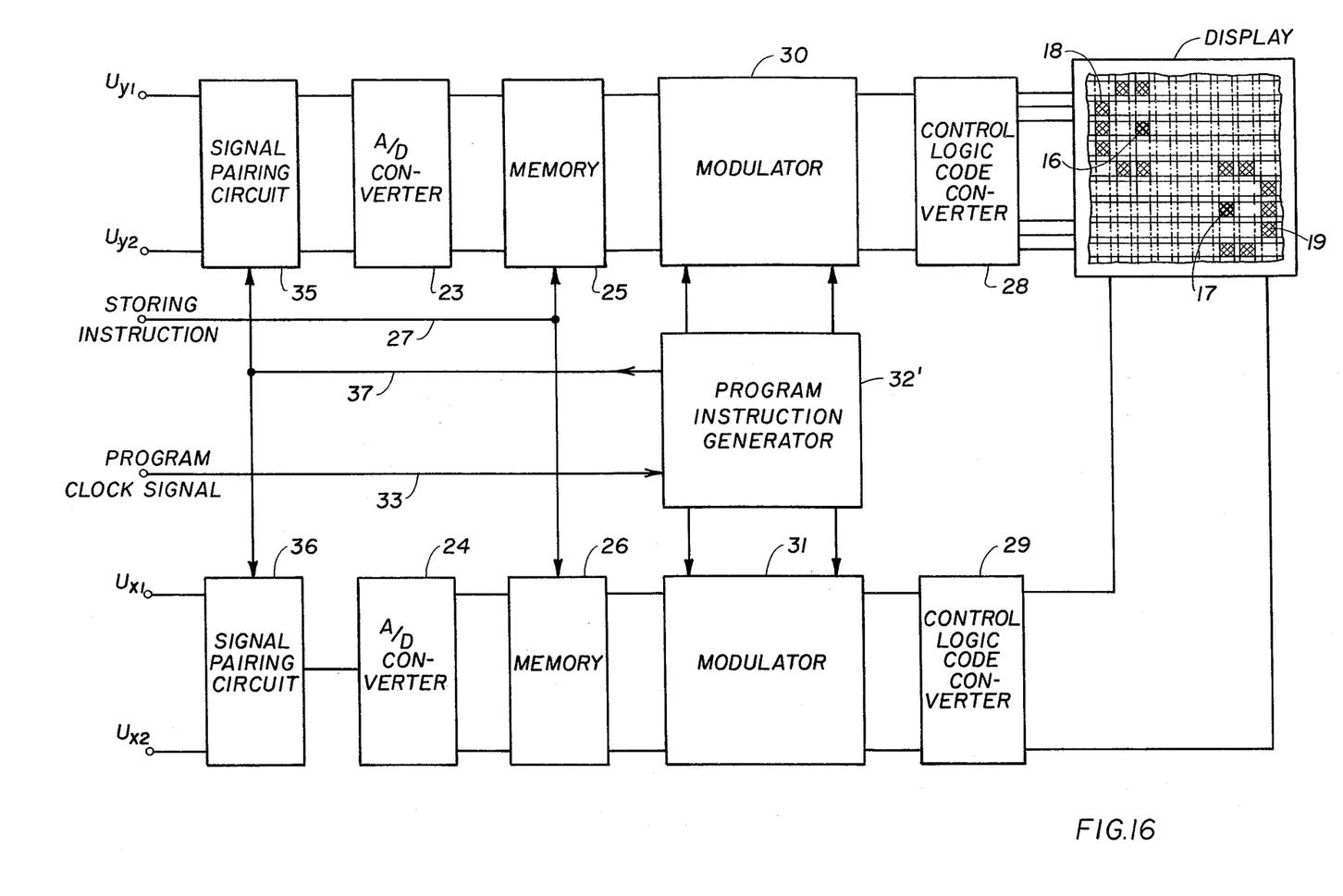
FIG. 16 illustrates a further modified electronic circuit arrangement for controlling the display of two light dots with respectively characterizing lighted semi-circles.

FIGS. 14, 15 and 16 illustrate circuit block diagrams of electronic components forming signal channels for controlling the display of unbalance informations. FIGS. 15 and 16 illustrate in addition the display of signifying or characterizing symbols for enhancing or underlining the information display light dot. The input signal components $U_y$ and $U_x$ are analog signals representing, for example, respectively a horizontal and vertical unbalance component. Similarly, the signals $U_{y1}$ and $U_{y2}$ may represent the horizontal unbalance components of two separate unbalance informations. This applies also to the signals $U_{x1}$ and $U_{x2}$. These input signals may be derived in the same manner as, for instance, disclosed in U.S. Pat. No. 3,554,061 issued on Jan. 12, 1971.

In the circuit arrangement of FIG. 15, the analog voltages $U_y$ and $U_x$ representing respective unbalance signal components are applied to corresponding analog to digital converters 23 and 24. The analog to digital converter 23 has '$n$' individual outputs which provide a binary signal of '$n$' bits. Similarly, the analog to digital converter 24 has '$m$' outputs providing a binary signal of '$m$' bits. The '$n$' outputs of the A/D converter 23 are connected to a respective number of inputs of a storage or memory 25. Similarly, the '$m$' outputs of the A/D converter 24 are connected to a respective number of '$m$' inputs of a further storage or memory 26. The memories 25 and 26 have control inputs connected to a common storing instruction input terminal 27. In its simplest embodiment the storing instruction terminal 27 may be represented by a hand operated switch. It may also be a sensing means which provides the storing instruction signal to the memories 25 and 26 in response to the fact that the body to be balanced has reached the measuring r.p.m.

The outputs of the memories 25 and 26 are connected to respective control logic circuit means and code converters 28 and 29. The outputs of the control logic 28 are connected to the horizontal row electrodes of the liquid crystal display device constructed according to the invention. The control logic circuit means 28 convert the binary signal comprising '$n$' bits and appearing at its input terminals into a signal represented by a 1 out of $2^n$ code. Accordingly, the control logic 28 has $2^n$ input conductors connected to the respective number '$z$' of cross electrodes ($z = 2^n$). The same function is performed by the control logic 29 for converting the '$m$' bit binary signal appearing at the input of the control logic 29 into a signal represented by the one out of $2^m$ code, whereby $2^m$ output conductors connect the control logic 29 to the respective number '$s$' of column electrodes of the liquid crystal display ($s = 2^m$). In this manner the cross and column electrodes which, for example, cross each other at the light dot 16 are energized and the light dot 16 is accordingly displayed and its position provides an analog indication of the quantity or size of the unbalance. The analog to digital converters 23 and 24, the memory or storage circuits 25 and 26, and the control logic circuit blocks 28 and 29 all comprise conventional logic circuit means.

FIG. 15 illustrates a circuit block diagram similar to that of FIG. 14. However, additional circuit means are employed in FIG. 15 for displaying around the light dot 16 a somewhat circular symbol 15, the light intensity of which may be lower than that of the light dot 16. The elements which are employed in FIG. 14 and in FIG. 15 are provided with the same reference numerals in both figures. However, a modulating circuit 30 is arranged between the output of the memory 25 and the input of the control logic circuit 28. Similarly, a modulating circuit 31 is arranged between the output of the memory 26 and the input of the control logic circuit 29. The two modulating circuits are connected with control inputs to a program instruction circuit which may, for instance be a read only memory 32. The read only memory 32 has a program clock signal input 33. Thus, the program instruction or read only memory 32 adds an additional voltage to the binary signals in the modulator 30 or 31 respectively, whereby the unbalance information displaying dot 16 is surrounded by an additional signifying symbol, as explained in more detail with reference to FIGS. 11, 12 and 13. The modulator circuits 30 and 31 may comprise conventional digital adder circuits.

The circuit arrangement according to FIG. 16 is constructed and arranged for displaying two separate unbalance informations simultaneously. To this end each signal channel is provided with a signal pairing circuit 35 or 36 respectively. These signal pairing circuits may be conventional selector switches which are repeatedly switched back and forth between the two measuring points supplying the respective input voltage $U_{y1}$, $U_{y2}$ and $U_{x1}$, $U_{x2}$. To this end the program instruction generator 32' which otherwise functions in the same manner as the read only memory 32 of FIG. 15, supplies a control signal to the inputs of the signal pairing circuits 35 and 36 through a conductor 37 to provide for a time multiplex type of operation. To this end the program instruction generator 32' may comprise a conventional signal frequency divider which divides the clock signal into 16 step units, whereby for example during steps 1 to 8 $U_{x1}$ is converted into a binary signal, whereas during steps 9 to 16 $U_{x2}$ is so converted. Similar remarks apply to $U_{y1}$ and $U_{y2}$. Otherwise, the program instruction generator 32' controls the two modulators 30 and 31 similar to the control provided in FIG. 15 except that in FIG. 16, the semi-circles 18 and 19 are displayed as signifying or characterizing symbols, whereas in FIG. 15 a somewhat circular symbol is displayed.

An advantage of the invention is seen in that the combination of a liquid crystal display panel with a scale results in a rather flat display device which requires but a minimum of space and which may be constructed as a free standing instrument taking up much less space than, for example, a cathode ray tube display device. The free standing arrangement of the present flat display device increases the visibility and in addition substantially reduces parallax errors. Moreover, several display devices may be superimposed upon each other as, for example, described above with reference to FIG. 4. Thus, one display device, for example, D1 may be employed for the display of the unbalance information, whereas the other display device D2 may be constructed to form the dial itself. Moreover, several display systems may be coordinated between a single base plate and a single cover plate by employing different electrode element symbols as described above with reference to FIGS. 5 to 9 and 17. Where both display devices D1 and D2 as shown in FIG. 4 are employed for displaying two separate unbalance information signals a dial may be secured to the front face of the cover plate 3, for example, by gluing or the like. The dial may be produced by printing or even by printed circuit techniques.

In the embodiment where a liquid crystal display device is used to form the dial, one electrode is formed as a continuous transparent layer whereas the other electrode system comprises a plurality of individually controllable electrodes arranged as a coordinate system.

According to the invention, especially with reference to FIG. 4, one of the plates may be thicker than the other, whereby the thinner plate would preferably carry the dial.

A further cover plate may be provided which is transparent and which protects the dial. Instead of arranging the dial on one of the plates, a separate dial, for example, in the form of a separate liquid crystal display device may be superimposed upon the unbalance information liquid crystal display device, whereby the dial by suitable control means may be displayed only for the duration of the reading. This embodiment has the further advantage that the dial may be varied by remote control, for example, by displaying differently spaced concentric rings of a polar coordinate system.

Further, in connection with the embodiment of FIG. 4, the contrast enhancing member 13 may be a colored glass plate or a colored transparent foil or the like.

In any event, it is advantageous that the control means and the display device together with the dial may be constructed as an integral unit constituting an integrated circuit block requiring but a limited number of control input terminals and which is substantially free of trouble and hence requires hardly any maintenance.

According to the process of the invention, the electrodes of the base plate and the electrodes of the cover plate of a liquid crystal display device provided with a dial as taught herein are separately supplied with the unbalance component signals representing the unbalance information. Where the unbalance information is derived from but one plane, it is advantageous to enhance the display by a further marking by means of time multiplexing as has been described above.

Where several planes through a body to be balanced are employed for deriving the respective separate unbalance information, the corresponding display light dots may be distinguished from each other by a time multiplex control of additional crossing points adjacent to the fully energized crossing point displaying the light dot corresponding to the unbalance information.

Due to the fact that the present display is completely flat, it is relatively easy to store the respective information by optical means, for instance, on a film. To this end a camera is schematically shown in FIG. 3. The present arrangement has the advantage that the camera may be arranged on the backside of the display device, thus avoiding any interference with the reading of the front side so that reading and photographic storing of the information may take place simultaneously without interfering with each other.

As a further embodiment according to the invention the dial may be, for example, provided with a tolerance or tolerance range indicating device. Thus, mass produced articles such as the rotors of fractional horse power motors may be tested with regard to their unbalance, whereby all test pieces falling outside the permissible tolerance or tolerance range would be automatically indicated.

Although the invention has been described with reference to specific example embodiments, it is to be understood, that it is intended to cover all modifications and equivalents within the scope of the appended claims.

What is claimed is:

1. A display device for displaying an unbalance information for a body to be balanced in at least one plane, comprising a liquid crystal display panel, transparent dial means superimposed upon said liquid crystal display panel, means holding said liquid crystal display panel and said transparent dial means in an operational relationship to each other, said liquid crystal display panel comprising row electrodes and column electrodes each including respective row electrode elements and column electrode elements, said electrode elements having different configurations, said row electrodes further comprising first means for conductively interconnecting elements of the same configuration to form a plurality of rows, said column electrodes further comprising second means for conductively interconnecting elements of the same configuration to form a plurality of columns, said rows and columns being arranged so that elements of the same configuration are in register with each other and so that an element of one configuration alternates with an element of another configuration in the physical distribution of said electrode elements in said liquid crystal display panel.

2. The unbalance information display device according to claim 1, wherein said liquid crystal display panel comprises a first plate, said row electrodes forming an electrode raster on said first plate, a second plate, said column electrodes forming a further electrode raster on said second plate, said electrode rasters facing each other, liquid crystal means located intermediate said electrode rasters, at least one of said plates being transparent, and wherein said transparent dial means are secured to said transparent plate opposite its respective electrode raster.

3. The unbalance information display device according to claim 1, further comprising a transparent protective cover on top of said dial means.

4. The unbalance information display device according to claim 1, wherein said dial means has a given configuration, said dial means comprising a first set of dial electrodes resembling said dial configuration and secured to said liquid crystal panel, a dial base plate, a second set of dial electrodes secured to said dial base plate, and further liquid crystal means between said first and second sets of dial electrodes, whereby the dial means form a second liquid crystal display panel which is superimposed upon said first mentioned liquid crystal display panel.

5. The unbalance information display device according to claim 4, further comprising contrast enhancing means interposed between said first and second liquid crystal display panels.

6. The unbalance information display device according to claim 1, comprising a first plate and a second plate, a first set of electrodes secured to one of said plates, a second set of electrodes secured to the other of said plates, said first and second set of electrodes facing each other, and liquid crystal means interposed between said electrodes, said first and second set of electrodes comprising a plurality of electrode elements, at least one of said plates being transparent, and wherein the electrodes secured to the transparent plate are also transparent, said dial means being secured to said transparent plate.

7. The unbalance information display device according to claim 6, wherein said dial means are secured to one surface of said transparent plate while the respective set of transparent electrodes is secured to the opposite surface of said transparent plate.

8. The unbalance information display device according to claim 1, further comprising control means for said liquid crystal display device, said control means being arranged at the liquid crystal display device or as part thereof.

9. A process for displaying an unbalance information for a body to be balanced in at least one plate comprising, employing a liquid crystal display device having row electrodes and column electrodes with respective input terminals, providing said row electrodes and said column electrodes with electrode elements having alternately different configurations, registering row electrodes with column electrodes so that electrodes with the same configuration register with each other to form a pair, superimposing a dial on said liquid crystal display device, separating said unbalance information into two signal components, storing said signal components in separate signal channels and supplying said separate signal components to said row and column input terminals to simultaneously display with the aid of said superimposed dial the size and angular position of said unbalance information relative to said body to be balanced.

10. The process according to claim 9, wherein said unbalance information is separated in horizontal and vertical signal components, and supplying the horizontal signal components to said row electrodes, and said vertical signal components to said column electrodes.

11. The process according to claim 9, for displaying unbalance informations relating to a plurality of planes in a body to be balanced comprising employing a liquid crystal display device having a set of column electrodes and a set of row electrodes for each plane of said body to be balanced, separating and storing the unbalance information signals for each plane separately, supplying the respective separate signal components to the corresponding row and column electrodes, and displaying with the aid of said dial an unbalance information separately for each plane of said body to be balanced.

12. The process according to claim 9, further comprising employing a transparent liquid crystal display device and dial, reading the displayed information on the front side of said dial and photographically storing the displayed information from the rear side of the transparent liquid crystal display device.

* * * * *